US009914441B2

(12) United States Patent
Takeda et al.

(10) Patent No.: US 9,914,441 B2
(45) Date of Patent: Mar. 13, 2018

(54) BRAKING DISTANCE CONTROL DEVICE

(71) Applicant: Hitachi Construction Machinery Co., Ltd., Taito-ku, Tokyo (JP)

(72) Inventors: Koei Takeda, Tsuchiura (JP); Shinjiro Saito, Kasumigaura (JP)

(73) Assignee: Hitachi Constuction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/118,506

(22) PCT Filed: Jul. 2, 2015

(86) PCT No.: PCT/JP2015/069203
§ 371 (c)(1),
(2) Date: Aug. 12, 2016

(87) PCT Pub. No.: WO2016/013376
PCT Pub. Date: Jan. 28, 2016

(65) Prior Publication Data
US 2017/0182989 A1 Jun. 29, 2017

(30) Foreign Application Priority Data
Jul. 23, 2014 (JP) ................................ 2014-149960

(51) Int. Cl.
*B60T 8/72* (2006.01)
*B60L 7/26* (2006.01)
(Continued)

(52) U.S. Cl.
CPC ........... *B60T 8/72* (2013.01); *B60L 7/26* (2013.01); *B60L 11/08* (2013.01); *B60T 8/172* (2013.01);
(Continued)

(58) Field of Classification Search
USPC .................... 701/70, 93, 22, 84, 96
See application file for complete search history.

(56) References Cited

U.S. PATENT DOCUMENTS 6,299,263 B1  10/2001 Uematsu et al.
2002/0008423 A1* 1/2002 Yasui .................. B60T 8/1766
303/9.62
(Continued)

FOREIGN PATENT DOCUMENTS

JP   10-320700 A   12/1998
JP   3743692 B2    2/2006
(Continued)

OTHER PUBLICATIONS

International Search Report (PCT/ISA/210) issued in PCT Application No. PCT/JP2015/069203 dated Aug. 4, 2015 with English translation (5 pages).
(Continued)

*Primary Examiner* — Richard A Goldman
(74) *Attorney, Agent, or Firm* — Crowell & Moring LLP

(57) ABSTRACT

A braking distance control device employed for an electrically driven work vehicle includes a safety vehicle speed calculation unit that calculates a safety vehicle speed at which a braking distance provided by use of an electric brake device becomes less than or equal to a threshold value, based on gradient information, payload information, road surface friction information, vehicle speed information, and a braking torque characteristic of electric motors: a critical vehicle speed for deceleration calculation unit that calculates a critical vehicle speed for deceleration at which deceleration provided by use of the electric brake device becomes less than or equal to a threshold value; and an operation judgment unit 14 that judges a setting of notification, based on pedal operation amounts.

4 Claims, 6 Drawing Sheets

(51) Int. Cl.
 *B60L 11/08* (2006.01)
 *B60T 8/172* (2006.01)
 *B60T 8/18* (2006.01)
 *B60T 8/24* (2006.01)
 *B60T 8/52* (2006.01)

(52) U.S. Cl.
 CPC .............. *B60T 8/18* (2013.01); *B60T 8/245* (2013.01); *B60T 8/52* (2013.01); *B60T 2210/12* (2013.01); *B60T 2220/04* (2013.01)

(56) References Cited

U.S. PATENT DOCUMENTS

| | | | |
|---|---|---|---|
| 2003/0036839 A1* | 2/2003 | Han | B60T 8/18 |
| | | | 701/70 |
| 2006/0265115 A1* | 11/2006 | Etori | B60W 30/17 |
| | | | 701/96 |
| 2009/0099886 A1 | 4/2009 | Greiner et al. | |
| 2010/0256848 A1* | 10/2010 | Sasaki | B60K 6/46 |
| | | | 701/22 |
| 2010/0280729 A1* | 11/2010 | Samsioe | B60T 7/22 |
| | | | 701/93 |
| 2012/0205169 A1* | 8/2012 | Montocchio | B60T 10/02 |
| | | | 180/54.1 |
| 2013/0030647 A1 | 1/2013 | Shimasaki et al. | |
| 2016/0016566 A1* | 1/2016 | Kumar | B60T 8/1705 |
| | | | 701/70 |
| 2016/0257309 A1* | 9/2016 | Kumar | B60W 30/143 |
| 2017/0113670 A1* | 4/2017 | Farres | B60T 13/662 |

FOREIGN PATENT DOCUMENTS

| | | |
|---|---|---|
| JP | 2010-96721 A | 4/2010 |
| JP | 2010-183687 A | 8/2010 |
| JP | 2011-501264 A | 1/2011 |
| WO | WO 2011/108081 A1 | 9/2011 |

OTHER PUBLICATIONS

Japanese-language Written Opinion (PCT/ISA/237) issued in PCT Application No. PCT/JP2015/069203 dated Aug. 4, 2015 (3 pages).
International Preliminary Report on Patentability (PCT/IB/338 & PCT/IB/373) issued in PCT Application No. PCT/JP2015/069203 dated Feb. 2, 2017, including English translation of document C2 (Japanese-language Written Opinion (PCT/ISA/237)) previously filed on Aug. 12, 2016 (seven (7) pages).

* cited by examiner

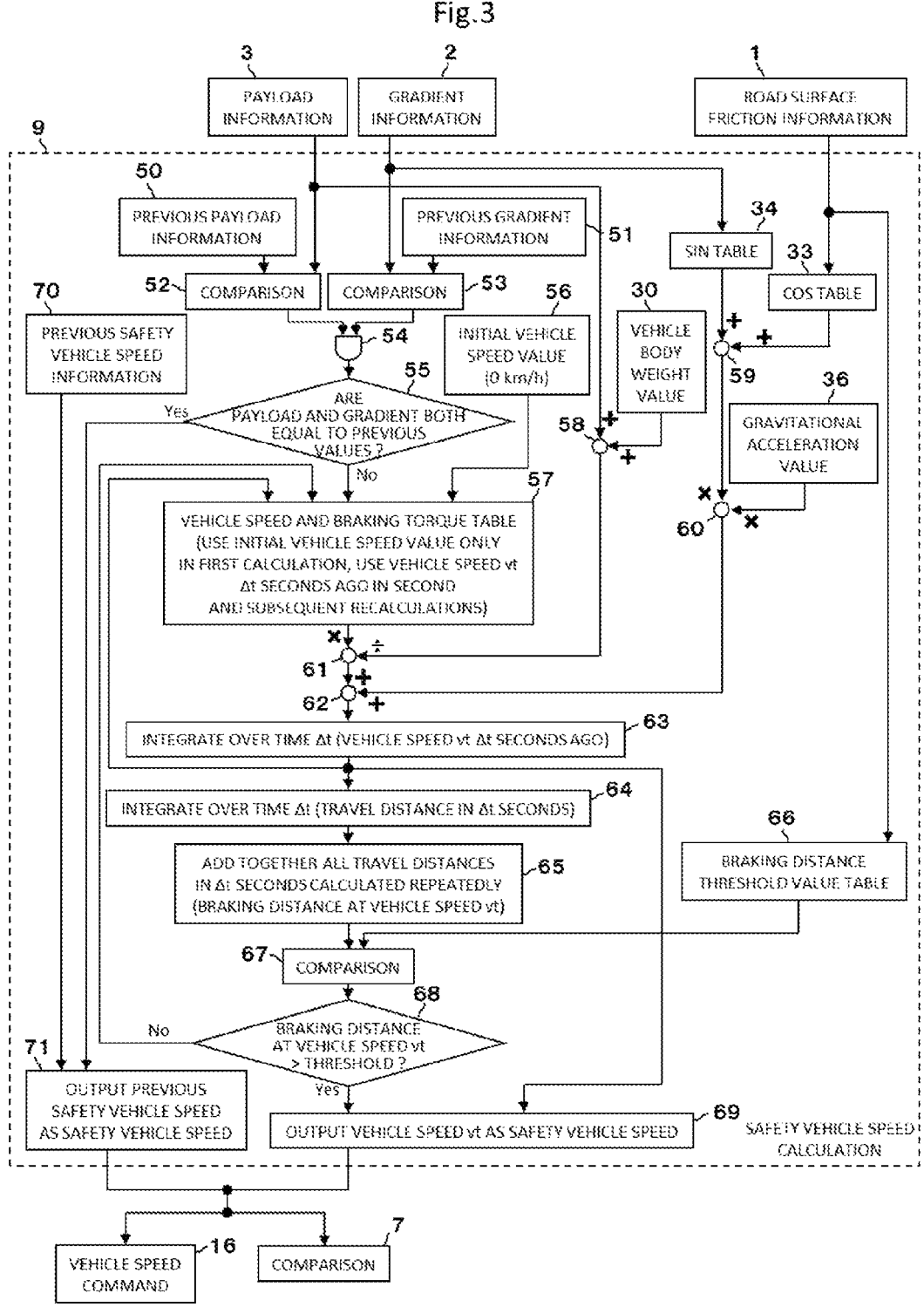

Fig.4

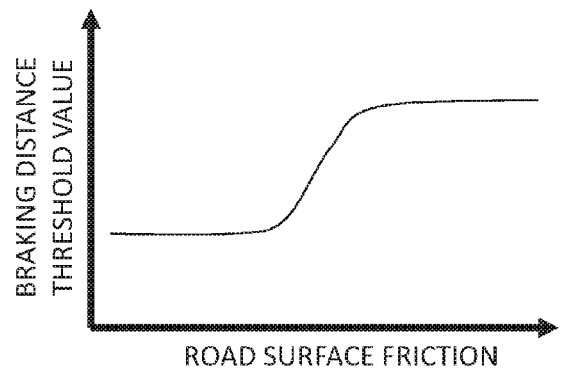

Fig.5

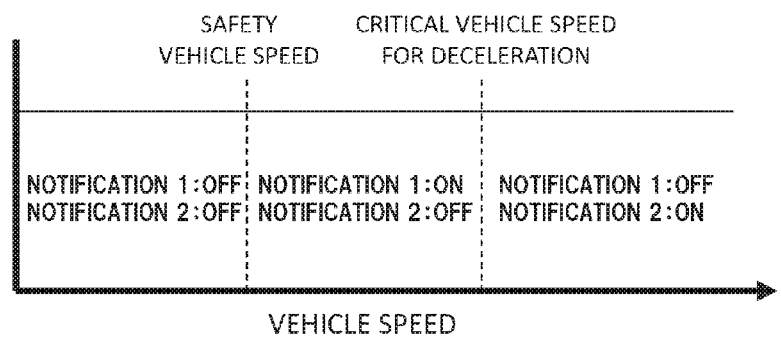

Fig.6

| | PRIORITY | OPERATION AMOUNT IS LESS THAN THRESHOLD | OPERATION AMOUNT IS GREATER THAN OR EQUAL TO THRESHOLD |
|---|---|---|---|
| ACCELERATOR PEDAL | 3 | NOTIFICATION 1: ON<br>NOTIFICATION 2: ON | NOTIFICATION 1: ON<br>(SET TO OFF IF ACCELERATOR PEDAL OPERATION AMOUNT REMAINS GREATER THAN OR EQUAL TO THRESHOLD FOR TIME t)<br>NOTIFICATION 2: ON<br>(SET TO OFF IF ACCELERATOR PEDAL OPERATION AMOUNT REMAINS GREATER THAN OR EQUAL TO THRESHOLD FOR TIME t) |
| ELECTRIC BRAKE PEDAL | 2 | NOTIFICATION 1: ON<br>NOTIFICATION 2: ON | NOTIFICATION 1: OFF<br>NOTIFICATION 2: ON |
| NON-ELECTRIC BRAKE PEDAL | 1 | NOTIFICATION 1: ON<br>NOTIFICATION 2: ON | NOTIFICATION 1: OFF<br>NOTIFICATION 2: OFF |

BRAKING DISTANCE CONTROL DEVICE

TECHNICAL FIELD

The present invention relates to a braking distance control device for reducing the increase in the braking distance of an electrically driven work vehicle that travels by the driving of drive wheels with electric motors.

BACKGROUND ART

There have been known electrically driven vehicles of a hybrid type in which a generator is driven by an engine and electric power generated by the generator is supplied to a motor for rear wheels to drive the rear wheels. When such an electrically driven vehicle of the hybrid type travels at high speed, the motor torque drops due to the increase in the revolution speed of the motor, and the braking distance of the vehicle can increase significantly especially when the vehicle carries a heavy load and travels on a downward slope or the like. When the braking distance increases, it is common to brake the vehicle by also using one of an exhaust brake device, a hydraulic brake device and a mechanical brake device in addition to an electric brake which uses the motor torque for the braking. When the braking distance increases and the braking time extends significantly, overheating of brake devices can occur especially in cooled brake devices such as the electric and mechanical brake devices and deterioration due to friction and heating can occur especially in the hydraulic and mechanical brake devices.

Therefore, in order to avoid the significant increase in the braking distance, there has already been proposed an automatic control unit that makes the vehicle speed equal to a preset control vehicle speed (see Patent Document 1, for example).

PRIOR ART DOCUMENT

Patent Document

Patent Document 1: Japanese Patent No. 3743692

SUMMARY OF THE INVENTION

Problem to be Solved by the Invention

However, the control vehicle speed, which is used as the target value of the vehicle speed control in the automatic control unit of the Patent Document 1, is a value arbitrarily set by the operator. The highest vehicle speed that can be reduced to zero by the electric brake varies with various conditions such as the gradient of the road surface and the payload. There are also cases where the setting of the control vehicle speed by the operator is inappropriate in the first place. Thus, even if the vehicle speed is made equal to the control vehicle speed, the braking distance can increase while the operator is unaware of it.

The object of the present invention is to provide a braking distance control device capable of reducing the increase in the braking distance appropriately depending on the situation.

Means for Solving the Problem

To achieve the above object, the present invention provides a braking distance control device employed for an electrically driven work vehicle that is equipped with an AC generator driven by a prime mover and travel electric motors driven by electric power supplied from the AC generator and is braked by an electric brake device using torque generated by the electric motors, the braking distance control device including: an information acquisition unit that acquires the gradient information, payload information, road surface friction information, and vehicle speed information; and a safety vehicle speed calculation unit that calculates a safety vehicle speed at which a braking distance provided by use of the electric brake device becomes less than or equal to a threshold value, based on the gradient information, the payload information, the road surface friction information, the vehicle speed information, and a previously given braking torque characteristic of the electric motors.

Effect of the Invention

According to the present invention, the increase in the braking distance can be reduced appropriately depending on the situation.

BRIEF DESCRIPTION OF THE DRAWINGS

FIG. 3 is a functional block diagram of a safety vehicle speed calculation unit of the braking distance control device according to the first embodiment of the present invention;

FIG. 4 is a diagram showing an example of a braking distance threshold value table which is used in the braking distance control device according to the first embodiment of the present invention;

FIG. 5 is a diagram showing an example of judgment conditions used by a vehicle speed judgment unit of the braking distance control device according to the first embodiment of the present invention;

FIG. 6 is a diagram showing an example of judgment conditions used by an operator operation judgment means of the braking distance control device according to the first embodiment of the present invention;

MODE FOR CARRYING OUT THE INVENTION

Figure 1:
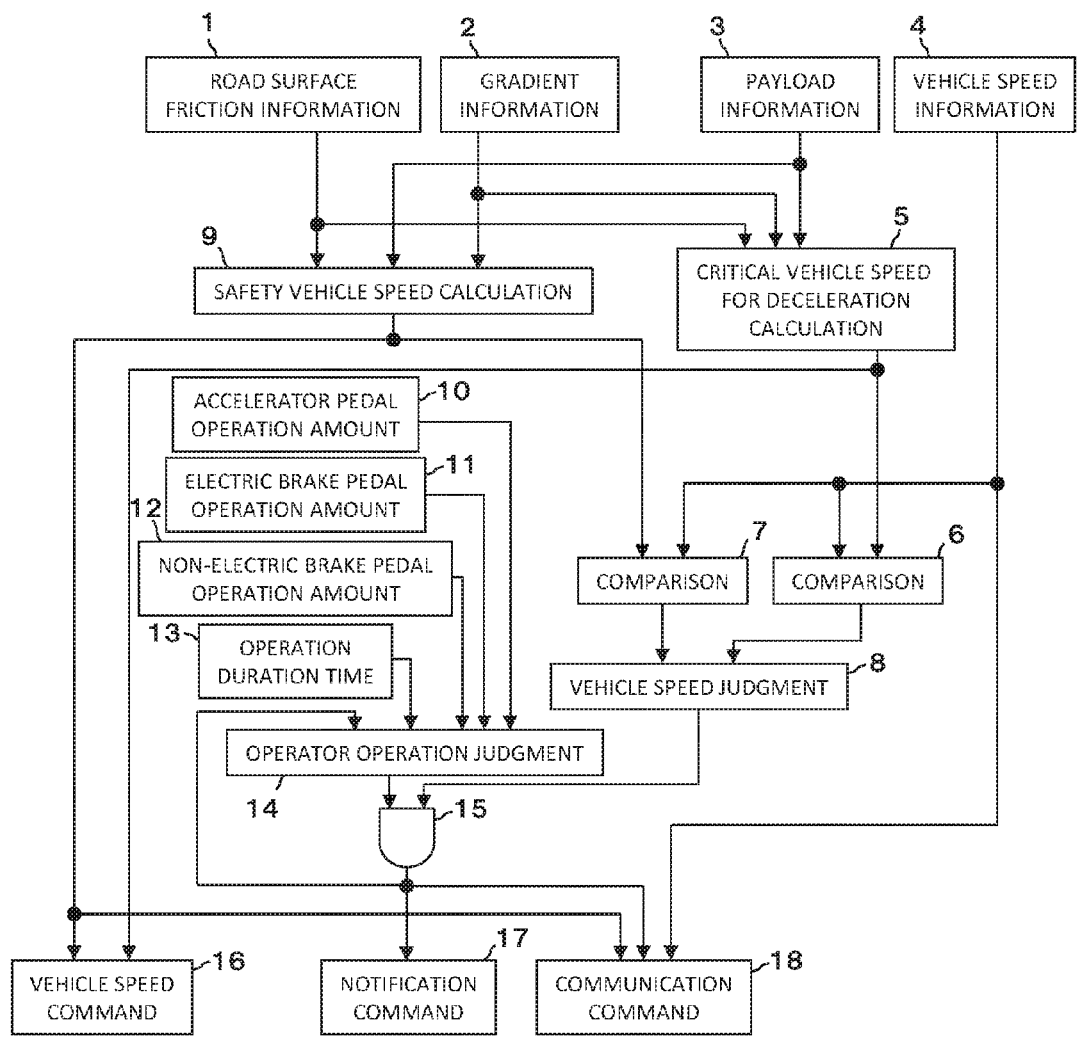
FIG. 1 is a functional block diagram of a braking distance control device according to a first embodiment of the present invention.

Referring now to the drawings, a description will be given in detail of preferred embodiments in accordance with the present invention.

First Embodiment

FIG. 1 is a functional block diagram of a braking distance control device according to a first embodiment of the present invention.

The braking distance control device shown in FIG. 1 is employed for an electrically driven work vehicle, such as a dump truck, that includes an AC generator driven by a prime mover and at least two travel electric motors (for driving rear wheels, for example) driven by electric power supplied from the AC generator, and that is braked by an electric braking device using torque generated by the electric motors. The braking distance control device includes information acquisition units 1 to 4 and 10 to 13, a critical vehicle speed for deceleration calculation unit 5, a safety vehicle speed calculation unit 9, a vehicle speed judgment unit 8, an operator operation judgment unit 14, a logical product calculation unit 15, a vehicle speed command unit 16, a notification command unit 17 and a communication command unit 18 as its main components. These components will be explained in turn below.

1. Information Acquisition Units 1 to 4 and 10 to 13

The information acquisition units 1 to 4 are means for respectively acquiring road surface friction information, gradient information, payload information and vehicle speed information. The information acquisition units 10 to 13 are means for respectively acquiring information on an accelerator pedal operation amount, an electric brake pedal operation amount, a non-electric brake pedal operation amount and time.

The information acquisition unit 1 for acquiring the road surface friction information may employ, for example, a device that detects the revolution speeds of drive wheels and driven wheels of the vehicle, calculates a slip ratio from the difference between the revolution speeds, and estimates the road surface friction information from the result of the calculation. The information acquisition unit 2 for acquiring the gradient information on the road surface may employ a device (elaborated on in JP-S63-117211A, for example) that calculates the difference between an output value of an in-vehicle acceleration sensor and the derivative value of the vehicle speed, calculates a component of the gravitational acceleration in a direction parallel to the gradient, and estimates the gradient information from the result of the calculation, a device (elaborated on in JP-2010-047237A, for example) that estimates the gradient information by performing calculations based on an equation of motion by using an acceleration sensor value obtained from an acceleration sensor attached to the vehicle body and a torque value of a motor for driving the vehicle body, or the like. The information acquisition unit 3 for acquiring the payload information may employ a device that estimates the payload information by detecting a change in the vehicle body structure caused by the load by use of a strain gauge or the like mounted on the vehicle body of the electrically driven work vehicle as the object of the detection, a device that estimates the payload information by detecting loads applied to the axles of the front and rear wheels, or the like. The information acquisition unit 4 for acquiring the vehicle speed information may employ a device that calculates the vehicle speed information by detecting the revolution speed of a wheel, a device that detects the relative speed between the vehicle body and the road surface with a sensor using the Doppler effect, or the like.

The information acquisition unit 10 for acquiring the accelerator pedal operation amount information may employ, for example, a device that calculates the degree of depressing an accelerator pedal (unshown) based on the output of a potentiometer or the like of the accelerator pedal installed in the cab of the work vehicle. The information acquisition unit 11 for acquiring the electric brake pedal information may employ, for example, a device that calculates the degree of depressing an electric brake pedal on the basis of the output of a potentiometer or the like attached to a pedal of an electric brake device (unshown) installed in the cab. The information acquisition unit 12 for acquiring the non-electric brake pedal information may employ, for example, a device that calculates the degree of depressing a non-electric brake pedal on the basis of the output of a potentiometer or the like attached to a pedal of a non-electric brake device (e.g., brake device made by combining at least one selected from a hydraulic brake device, a mechanical brake device and an exhaust brake device) installed in the cab. The information acquisition unit 13 for acquiring the time information may employ, for example, a device that calculates a time from a certain time to a certain time on the basis of time information from a timer (unshown).

2. Critical Vehicle Speed for Deceleration Calculation Unit 5

The critical vehicle speed for deceleration calculation unit 5 is a functional unit that calculates motor torque based on the information acquired by the information acquisition units 1 to 4 (the gradient information, the payload information, the road surface friction information and the vehicle speed information) and a previously given braking torque characteristic of the electric motors and calculates a critical vehicle speed for deceleration from the calculated motor torque. The critical vehicle speed for deceleration is a critical vehicle speed to allow the deceleration of the work vehicle that is provided by use of the electric brake using the electric motors to be lower than or equal to a threshold value, that is, a vehicle speed above which the deceleration provided by use of the electric brake exceeds the threshold value.

The critical vehicle speed for deceleration calculation unit 5 calculates the critical vehicle speed for deceleration according to the following expression (1):

$$2F = Ma - \mu Mg \cos\theta - Mg \sin\theta \quad (1)$$

where F represents motor torque for one wheel on the assumption that the left and right electric motors output the same torque, M represents vehicle body gross weight as the sum total of the vehicle body weight and the load, "a" represents the deceleration threshold value, $\mu$ represents a road surface friction coefficient, $\theta$ represents the gradient of the road surface, and g represents the gravitational acceleration.

Figure 2:
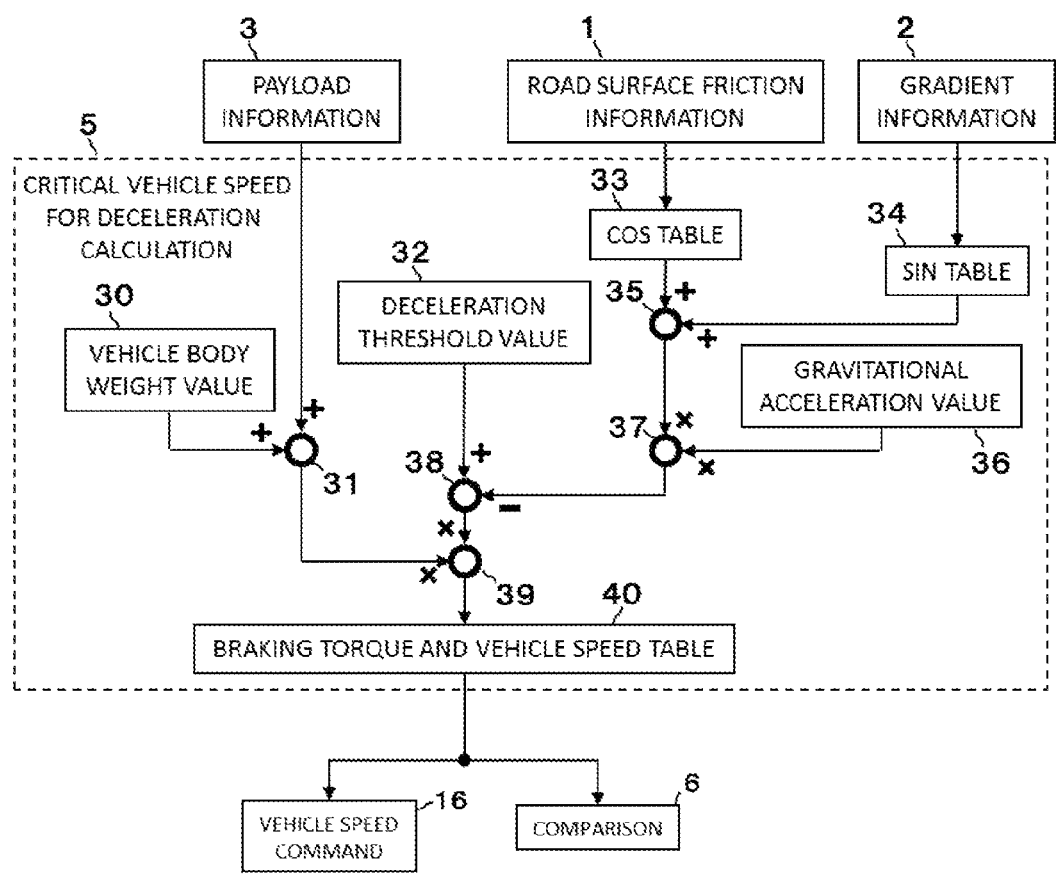
FIG. 2 is a functional block diagram of a critical vehicle speed for deceleration calculation unit of the braking distance control device according to the first embodiment of the present invention.

FIG. 2 is a functional block diagram of the critical vehicle speed for deceleration calculation unit 5.

A procedure for calculating the critical vehicle speed for deceleration in conformity with the expression (1) and the configuration of the critical vehicle speed for deceleration calculation unit 5 will be explained below with reference to FIG. 2.

The critical vehicle speed for deceleration calculation unit 5 includes storage units 30, 32 to 34, 36 and 40, addition units 31 and 35, multiplication units 37 and 39, and a subtraction unit 38. The storage unit 30 stores a vehicle body weight value, the storage unit 32 stores the deceleration threshold value (set value), the storage unit 33 stores a COS table, the storage unit 34 stores a SIN table, the storage unit 36 stores a gravitational acceleration value, and the storage unit 40 stores a torque-vehicle speed table (braking torque characteristic of the electric motors).

The critical vehicle speed for deceleration calculation unit 5 first calculates the vehicle body gross weight by having the addition unit 31 add together the vehicle body weight value read out from the storage unit 30 and the payload information inputted from the information acquisition unit 3.

In parallel with the above calculation, the critical vehicle speed for deceleration calculation unit 5 has the addition unit 35 add together a value calculated based on the road surface friction information inputted from the information acquisition unit 1 by use of the COS table read out from the storage unit 33 and a value calculated from the gradient information inputted from the information acquisition unit 2 by use of the SIN table read out from the storage unit 34. Then, the critical vehicle speed for deceleration calculation unit 5 has the multiplication unit 37 multiply the value calculated by the addition unit 35 by the gravitational acceleration value read out from the storage unit 36, and has the subtraction unit 38 subtract the value calculated by the multiplication unit 37 from the deceleration threshold value read out from the storage unit 32.

Then, the critical vehicle speed for deceleration calculation unit 5 calculates a motor torque value at which the deceleration of the work vehicle at the time of braking becomes equal to the deceleration threshold value by having the multiplication unit 39 multiply together the value calculated by the addition unit 31 and the value calculated by the subtraction unit 38. Finally, the critical vehicle speed for deceleration calculation unit 5 refers to the torque-vehicle speed table stored in the storage unit 40, thereby calculates the critical vehicle speed for deceleration from the motor torque value calculated by the multiplication unit 39, and outputs the critical vehicle speed for deceleration.

3. Safety Vehicle Speed Calculation Unit 9

The safety vehicle speed calculation unit 9 is a functional unit that calculates a safety vehicle speed based on the information acquired by the information acquisition units 1 to 4 (the gradient information, the payload information, the road surface friction information and the vehicle speed information) and the previously given braking torque characteristic of the electric motors. The safety vehicle speed is a vehicle speed at which the braking distance of the work vehicle obtained by use of the electric motor becomes less than or equal to a threshold value, that is, a speed above which the braking distance obtained by use of the electric brake exceeds the threshold value. The safety vehicle speed is a speed slower than the critical vehicle speed for deceleration.

FIG. 3 is a functional block diagram of the safety vehicle speed calculation unit 9.

A procedure for calculating the safety vehicle speed and the configuration of the safety vehicle speed calculation unit 9 will be explained below with reference to FIG. 3.

The safety vehicle speed calculation unit 9 includes storage units 30, 33, 34, 36, 50, 51, 56, 57, 66 and 70, comparison units 52, 53 and 67, a logical product calculation unit 54, judgment units 55 and 68, addition units 58, 62 and 65, a division unit 61, integration units 63 and 64, and safety vehicle speed output units 69 and 71. The storage unit 30 stores the vehicle body weight value, the storage unit 33 stores the COS table, the storage unit 34 stores the SIN table, and the storage unit 36 stores the gravitational acceleration value. The storage unit 50 stores the payload information that has been used for the previous safety vehicle speed calculation, the storage unit 51 stores the gradient information that has been used for the previous safety vehicle speed calculation, the storage unit 56 stores an initial vehicle speed value (0 km/h), the storage unit 57 stores a vehicle speed and braking torque table (braking torque characteristic of the electric motors), the storage unit 66 stores a braking distance threshold value table (road surface friction and braking distance threshold value table), and the storage unit 70 stores the safety vehicle speed calculated last time. Incidentally, while the storage units 30, 33, 34 and 36 are used also for the critical vehicle speed for deceleration calculation unit 5, storage units 30, 33, 34 and 36 specifically for the safety vehicle speed calculation unit 9 may also be provided separately from those for the critical vehicle speed for deceleration calculation unit 5.

The safety vehicle speed calculation unit 9 first has the comparison unit 52 compare the payload information inputted from the information acquisition unit 3 with the payload information at the time of the previous safety vehicle speed calculation read out from the storage unit 50. Meanwhile, the safety vehicle speed calculation unit 9 has the comparison unit 53 compare the gradient information inputted from the information acquisition unit 2 with the gradient information at the time of the previous safety vehicle speed calculation read out from the storage unit 51. The safety vehicle speed calculation unit 9 has the logical product calculation unit 54 calculate a logical product from the results of the comparison by the comparison units 52 and 53 and then has the judgment unit 55 judge whether the calculation of the safety vehicle speed is necessary or not by using the logical product calculated by the logical product calculation unit 54 as a judgment condition.

The judgment condition in the judgment unit 55 is that the payload information inputted this time equals the previous payload information and the gradient information inputted this time equals the previous gradient information. If the judgment condition is satisfied in the judgment unit 55 (i.e., when the current payload information equals the previous payload information and the current gradient information equals the previous gradient information), the safety vehicle speed calculation unit 9 cancels the calculation of the safety vehicle speed, reads out the previously calculated safety vehicle speed from the storage unit 70, and outputs the previously calculated safety vehicle speed via the safety vehicle speed output unit 71. In contrast, if the judgment condition is not satisfied in the judgment unit 55 (i.e., when the current payload information differs from the previous payload information and/or the current gradient information differs from the previous gradient information), the safety vehicle speed calculation unit 9 calculates and outputs the safety vehicle speed as described below. Incidentally, in the first calculation, the judgment condition is judged not to be satisfied in the judgment unit 55 as a matter of course.

For the calculation of the safety vehicle speed, the safety vehicle speed calculation unit 9 first reads out the initial vehicle speed value from the storage unit 56 and calculates the motor torque from the initial vehicle speed value by referring to the braking torque table stored in the storage unit 57. Incidentally, this calculation uses the initial vehicle speed value only in the first calculation. In the second and subsequent recalculations, vehicle speed vt Δt seconds ago is used, wherein Δt is a calculation cycle of the safety vehicle speed or a preset time, for example. Further, the safety vehicle speed calculation unit 9 calculates the vehicle body gross weight by having the addition unit 58 add together the payload information inputted from the information acquisition unit 3 and the vehicle body weight read out from the storage unit 30. Thereafter, the safety vehicle speed calculation unit 9 has the division unit 61 divide the motor torque calculated by use of the storage unit 57 by the vehicle body gross weight. Further, the safety vehicle speed calculation unit 9 has its addition unit 59 add together a value calculated based on the road surface friction information inputted from the information acquisition unit 1 by use of the COS table read out from the storage unit 33 and a value calculated based on the gradient information inputted from the information acquisition unit 2 by use of the SIN table read out from the storage unit 34. Furthermore, the safety vehicle speed calculation unit 9 has its multiplication unit 60 multiply the value calculated by the addition unit 59 by the gravitational acceleration value read out from the storage unit 36. Thereafter, the safety vehicle speed calculation unit 9 has the addition unit 62 add together the value calculated by the division unit 61 and the value calculated by the multiplication unit 60. The value obtained by the addition unit 62 is the deceleration of the work vehicle.

Subsequently, the safety vehicle speed calculation unit 9 has the integration unit 63 calculate vehicle speed vt Δt seconds ago by integrating the value calculated by the addition unit 62 over the time Δt, and then calculates a travel distance in Δt seconds by having the integration unit 64 further integrate the vehicle speed vt calculated by the integration unit 63 over the time Δt. As will be explained later, the travel distance in Δt seconds is calculated repeatedly by the integration unit 64 until the braking distance exceeds a threshold value in a judgment made by the judgment unit 68 (explained later). All the travel distances in Δt seconds calculated repeatedly are added together by the addition unit 65. The value calculated by the addition unit 65 is the braking distance at the vehicle speed vt calculated by the integration unit 63.

Meanwhile, the safety vehicle speed calculation unit 9 refers to the braking distance threshold value table stored in the storage unit 66 and thereby calculates a braking distance threshold value corresponding to the road surface friction information inputted from the information acquisition unit 1 on the basis of the inputted road surface friction information. As shown in FIG. 4, the braking distance threshold value table stored in the storage unit 66 has been set such that the braking distance threshold value decreases when the road surface friction coefficient is low in consideration of the fact that the braking distance increases due to wheel lock when the road surface friction coefficient is low.

Thereafter, the safety vehicle speed calculation unit 9 has the comparison unit 67 compare the braking distance at the vehicle speed vt calculated by the addition unit 65 with the braking distance threshold value calculated by use of the storage unit 66 and has the judgment unit 68 judge whether the braking distance at the vehicle speed vt is greater than the braking distance threshold value. When the braking distance at the vehicle speed vt is judged by the judgment unit 68 to be less than or equal to the braking distance threshold value, the safety vehicle speed calculation unit 9 refers to the braking torque table stored in the storage unit 57, calculates the motor braking torque at the vehicle speed vt calculated by the integration unit 63 on the basis of the calculated vehicle speed vt, and performs again the above-described process using the division unit 61, the addition unit 62, the integration units 63 and 64, the addition unit 65, the storage unit 66, the comparison unit 67 and the judgment unit 68. In contrast, when the braking distance at the vehicle speed vt is judged by the judgment unit 68 to be greater than the braking distance threshold value, the safety vehicle speed calculation unit 9 outputs the vehicle speed vt calculated by the integration unit 63 as the safety vehicle speed via the safety vehicle speed output unit 69.

4. Vehicle Speed Judgment Unit 8

In FIG. 1, the vehicle speed judgment unit 8 is a functional unit that judges whether the work vehicle can be stopped or not within a set distance by use of the braking torque of the electric motors on the basis of the result of comparing the vehicle speed information acquired by the information acquisition unit 4 with the safety vehicle speed and the critical vehicle speed for deceleration. A procedure for the vehicle speed judgment will be explained below.

First, a comparison unit 6 compares the vehicle speed information inputted from the information acquisition unit 4 with the critical vehicle speed for deceleration outputted from the critical vehicle speed for deceleration calculation unit 5 as explained referring to FIG. 2. Meanwhile, a comparison unit 7 compares the vehicle speed information inputted from the information acquisition unit 4 with the safety vehicle speed outputted from the safety vehicle speed calculation unit 9 as explained referring to FIG. 3. Based on the result of the comparison by these comparison units 6 and 7, the vehicle speed judgment unit 8 judges whether the work vehicle can be stopped within the set distance by use of the electric brake device alone, and then makes a judgment on settings (ON/OFF) of notifications 1 and 2 as illustrated in FIG. 5. The notification 1 is a notification issued in a situation where it can become impossible to stop the work vehicle within the set distance with only the braking torque of the electric motors in order to notify the operator of the situation, that is, a message for calling the operator's attention in regard to the braking operation. The notification 2 is a message for prompting active operation on the non-electric brake device in a situation where it is difficult to stop the work vehicle within the set distance with only the electric brake using the braking torque of the electric motors.

In the example shown in FIG. 5, when the vehicle speed information is less than the safety vehicle speed, the vehicle speed judgment unit 8 judges that the braking distance has been reduced sufficiently and the work vehicle can be stopped within the set distance with only the braking torque of the electric motors, and thus judges that the settings of the notifications 1 and 2 are both OFF. When the vehicle speed information is less than the critical vehicle speed for deceleration but is higher than or equal to the safety vehicle speed, the vehicle speed judgment unit 8 judges that the braking distance is increasing and it can become impossible to stop the work vehicle within the set distance with only the braking torque of the electric motors, and thus judges that the setting of the notification 1 is ON (the setting of the notification 2 is OFF). When the vehicle speed information is higher than or equal to the critical vehicle speed for deceleration, the safety vehicle speed calculation unit 9 judges that it is extremely difficult to stop the work vehicle within the set distance with only the electric brake using the braking torque of the electric motors, and thus judges that the setting of the notification 2 is ON (the setting of the notification 1 is OFF).

5. Operator Operation Judgment Unit 14

The operator operation judgment unit 14 judges the settings (ON/OFF) of the notifications 1 and 2 as illustrated in FIG. 6 on the basis of the accelerator pedal operation amount, the electric brake pedal operation amount, the non-electric brake pedal operation amount, and operation duration times of these pedals inputted respectively from the information acquisition units 10 to 13.

In the example shown in FIG. 6, when the accelerator pedal operation amount is less than a corresponding threshold value of the setting, the settings of the notifications 1 and 2 are judged to be both ON. The settings of the notifications 1 and 2 are basically judged to be both ON even when the accelerator pedal operation amount is greater than or equal to the threshold value. However, when the accelerator pedal operation amount thereafter remains greater than or equal to the threshold value and the operation duration time reaches a set time t, the operator is judged to be intentionally accelerating the work vehicle during the period of continuously operating the accelerator pedal at an operation amount greater than or equal to the threshold value, and thus the settings of the notifications 1 and 2 are exceptionally judged to be both OFF.

When the electric brake pedal operation amount is less than a corresponding threshold value of the setting, the settings of the notifications 1 and 2 are judged to be both ON. When the electric brake pedal operation amount is greater than or equal to the threshold value, the operator is judged to have the intention of deceleration, and the setting of the notification 1 is judged to be OFF. However, the setting of the notification 2 is judged to be ON irrespective of the operation amount in consideration of the possibility that stopping the work vehicle with only the electric brake is difficult.

When the non-electric brake pedal operation amount is less than a corresponding threshold value of the setting, the settings of the notifications 1 and 2 are judged to be both ON. When the non-electric brake pedal operation amount is greater than or equal to the threshold value, the operator is judged to have the intention of stopping the vehicle, and the settings of the notifications 1 and 2 are judged to be both OFF.

When two or more of those including the accelerator pedal, the electric brake pedal and the non-electric brake pedal are being operated, the settings of the notifications 1 and 2 are judged based on the operation amount of the pedal having the highest priority among the pedals being operated. The priority increases with the decrease in the numerical value shown in FIG. 6. In this example, the operation amount of the non-electric brake pedal is assigned the top priority as a basis of the judgment, and then the operation amount of the electric brake pedal and the operation amount of the accelerator pedal are prioritized in the descending order.

6. Logical Product Calculation Unit 15

The logical product calculation unit 15 is a functional unit that outputs the settings of the notification operation to the notification command unit 17 on the basis of the result of the judgments by the vehicle speed judgment unit 8 and the operator operation judgment unit 14. The settings of the notification operation outputted from the logical product calculation unit 15 are the logical products of the settings (ON/OFF) of the notifications 1 and 2 judged by the vehicle speed judgment unit 8 and the settings (ON/OFF) of the notifications 1 and 2 judged by the operator operation judgment unit 14. The setting of each notification 1, 2 is set to ON only when its setting has been judged to be ON by both the vehicle speed judgment unit 8 and the operator operation judgment unit 14.

For example, in a case where the vehicle speed is higher than or equal to the safety vehicle speed and less than the critical vehicle speed for deceleration, when the accelerator pedal is being operated (except when the pedal operation amount remains greater than or equal to the threshold value for the time t or longer) or when the electric brake device or the non-electric brake device is being operated and its pedal operation amount is less than the threshold value, the notification 1 is set to ON to notify the operator that the braking distance is increasing and thereby call the operator's attention. In a case where the vehicle speed is higher than or equal to the critical vehicle speed for deceleration, when the accelerator pedal is being operated (except when the pedal operation amount remains greater than or equal to the threshold value for the time t or longer), when the electric brake device is being operated, or when the non-electric brake device is being operated and its pedal operation amount is less than the threshold value, the notification 2 is set to ON to warn the operator to depress the non-electric brake device (operate the non-electric brake device at a pedal operation amount greater than or equal to the threshold value). Needless to say, the setting of the notification 1 outputted from the logical product calculation unit 15 is OFF when at least one of the vehicle speed judgment unit 8 and the operator operation judgment unit 14 has judged that the setting of the notification 1 is OFF, and the setting of the notification 2 outputted from the logical product calculation unit 15 is OFF when at least one of the vehicle speed judgment unit 8 and the operator operation judgment unit 14 has judged that the setting of the notification 2 is OFF. Thus, as shown in FIG. 5, the settings of the notifications 1 and 2 are naturally OFF when the vehicle speed information is less than the safety vehicle speed, the setting of the notification 1 can be ON only when the vehicle speed information is higher than or equal to the safety vehicle speed and less than the critical vehicle speed for deceleration, and the setting of the notification 2 can be ON only when the vehicle speed information is higher than or equal to the critical vehicle speed for deceleration.

7. Vehicle Speed Command Unit 16

The vehicle speed command unit 16 is a functional unit that issues commands representing the critical vehicle speed for deceleration and the safety vehicle speed to an output device (unshown) on the basis of the critical vehicle speed for deceleration calculated by the critical vehicle speed for deceleration calculation unit 5 and the safety vehicle speed calculated by the safety vehicle speed calculation unit 9. The critical vehicle speed for deceleration and the safety vehicle speed outputted by the output device are used by the operator as the reference for driving and operating the vehicle. The mode of the output by the output device is not particularly limited; not only display output to a display device but also other modes such as audio output to a speaker can be employed.

8. Notification Command Unit 17

The notification command unit 17 is a functional unit that commands a notification device (unshown) to perform a notification operation for calling the operator's attention or prompting the brake operation (notification 1, notification 2, no notification) based on the result of the judgment by the vehicle speed judgment unit 8. In this embodiment, the logical product calculation unit 15 judges the ON/OFF of the notifications 1 and 2 on the basis of the result of the judgments by the vehicle speed judgment unit 8 and the operator operation judgment unit 14 as explained above, and thus the command signal outputted from the notification command unit 17 has incorporated not only the result of the judgment by the vehicle speed judgment unit 8 but also the result of the judgment by the operator operation judgment unit 14. The mode of the notification is not particularly limited; not only audio output but also other modes such as display output can be employed. For example, a buzzer and a display can be employed as the modes of the notification device.

9. Communication Command Unit 18

The communication command unit 18 is a functional unit for communicating with an external terminal (PC or the like, unshown). The communication command unit 18 has a function of transmitting information, such as the vehicle speed information acquired by the information acquisition unit 4, the critical vehicle speed for deceleration calculated by the critical vehicle speed for deceleration calculation unit 5, the safety vehicle speed calculated by the safety vehicle speed calculation unit 9, and the settings of the notifications 1 and 2 calculated by the logical product calculation unit 15, to the external terminal. The transmission of these pieces of information to the external terminal by use of the communication command unit 18 makes it possible to manage relevant information such as the frequency of the increase of the braking distance over the threshold value.

10. Effect

According to this embodiment, by calculating the safety vehicle speed and the critical vehicle speed for deceleration corresponding to the current road surface friction condition, gradient, payload and vehicle speed on the basis of the vehicle speed information acquired by the information acquisition units 1 to 4, whether or not the work vehicle can be stopped within the set distance with only the electric brake device can be judged through the comparison with the safety vehicle speed and the critical vehicle speed for deceleration. The safety vehicle speed and the critical vehicle speed for deceleration are not values arbitrarily set by the operator but values calculated each time by taking into account the vehicle speed, the payload, the road surface information, and so forth. Therefore, the safety vehicle speed and the critical vehicle speed for deceleration have high reliability as bases of the judgment on whether or not the work vehicle can be stopped within the set distance with only the electric brake device. Judging the increase in the braking distance from the safety vehicle speed and the critical vehicle speed for deceleration makes it possible to contribute to the avoidance of situations where the braking distance increases while the operator is unaware of it and to reduce the increase in the braking distance appropriately depending on the situation.

Further, based on the result of the above-described judgment by the vehicle speed judgment unit 8, the notification device is commanded to perform the notification operation for calling the operator's attention (notification 1) when it is judged that the vehicle speed is less than the critical vehicle speed for deceleration but is over the safety vehicle speed and the braking distance is increasing, or to perform the notification operation for prompting the brake operation (notification 2) when it is judged that the vehicle speed is over the critical vehicle speed for deceleration and stopping the work vehicle with the electric brake device is difficult. This makes it possible to notify the operator of the current situation, prompt the operator to appropriately drive and operate the vehicle, and prevent the operator from falling into a dangerous driving condition.

Furthermore, in this embodiment, in commanding the notification device to perform the notification operation depending on the result of the judgment by the vehicle speed judgment unit 8, the operating status of the accelerator pedal and the brake pedals is judged by the operator operation judgment unit 14 and the result of the judgment on the notification settings by the operator operation judgment unit 14 is taken into account by the logical product calculation unit 15. Thus, whether the notification is necessary or not and the type of the notification can be judged while taking into account not only the vehicle speed, the payload and the road surface information but also the current operating status of the operator. Accordingly, improvement in the appropriateness of the judgment result can be expected.

Moreover, the vehicle speed command unit 16 indicates to the operator (notifies the operator of) the critical vehicle speed for deceleration and the safety vehicle speed corresponding to the current situation. Accordingly, the operator notified of the braking distance varying depending on the situation is enabled to reduce the increase in the braking distance, and to concentrate on the traveling within the safety vehicle speed by, for example, lessening the accelerator operation when the vehicle speed is about to exceed the safety vehicle speed.

In addition, the transmission of information to the external terminal by the communication command unit 18 enables centralized management of driving data of a plurality of work vehicles in the external terminal. For example, it becomes possible to manage the frequency of exceeding the safety vehicle speed or the critical vehicle speed for deceleration and driving tendencies in regard to each operator and to warn or call attention of problematic operators. This can also contribute to the reduction of the increase in the braking distance.

Second Embodiment

Figure 7:
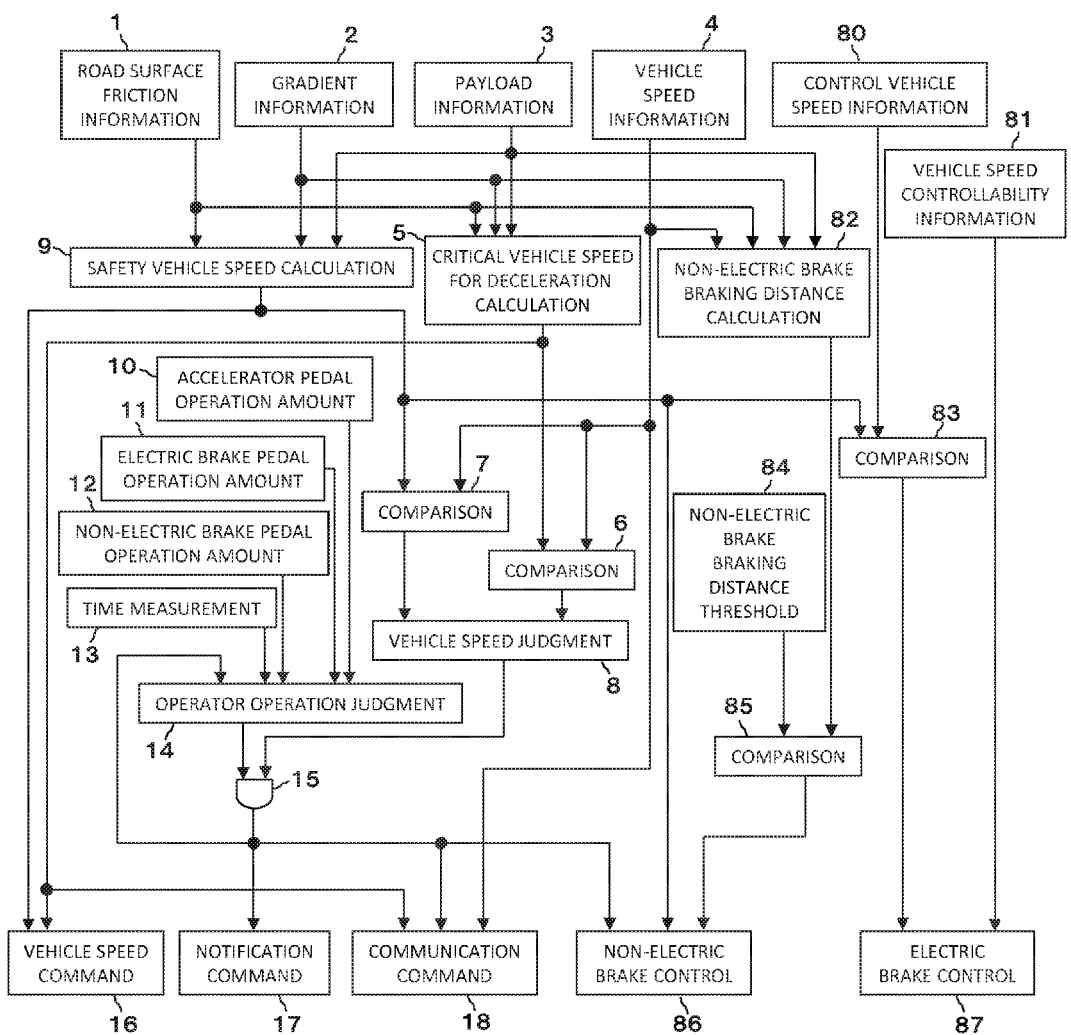
FIG. 7 is a functional block diagram of a braking distance control device according to a second embodiment of the present invention.

FIG. 7 is a functional block diagram of a braking distance control device according to a second embodiment of the present invention.

The braking distance control device according to this embodiment differs from that according to the first embodiment in further having a function of controlling the brake devices. The braking distance control device of this embodiment includes information acquisition units 80 and 81, a non-electric brake braking distance calculation unit 82, a non-electric brake control unit 86 and an electric brake control unit 87 in addition to the components constituting the braking distance control device of the first embodiment. Explanation of components equivalent to those in the first embodiment is omitted here. The additional components will be explained in turn below.

1. Information Acquisition Units 80 and 81

The information acquisition units 80 and 81 are means for acquiring control vehicle speed information and vehicle speed controllability information, respectively. The information acquired by each information acquisition unit 80, 81 is used as a basis of the vehicle speed control performed by the electric brake control unit 87. The information acquisition units 80 and 81 can be implemented by using an input device arranged near the cab seat. In this embodiment, it is assumed that a control vehicle speed and the vehicle speed controllability information (ON/OFF of a vehicle speed control function) are inputted and set by button operation performed by the operator.

2. Non-Electric Brake Braking Distance Calculation Unit 82

The non-electric brake braking distance calculation unit 82 calculates the deceleration according to a braking characteristic represented by the expression (2) on the basis of the road surface friction information, the gradient information, the payload information and the vehicle speed information inputted from the information acquisition units 1 to 4 and then calculates the braking distance provided by use of the non-electric brake device from the calculated deceleration.

$$a_{mec} = F_{mec}/M + \mu g \cos \theta + g \sin \theta \quad (2)$$

where $a_{mec}$ represents the deceleration, $F_{mec}$ represents the braking force when the non-electric brake is used, M represents the vehicle body gross weight, μ represents the road surface friction coefficient, θ represents the road surface gradient, and g represents the gravitational acceleration.

Figure 8:
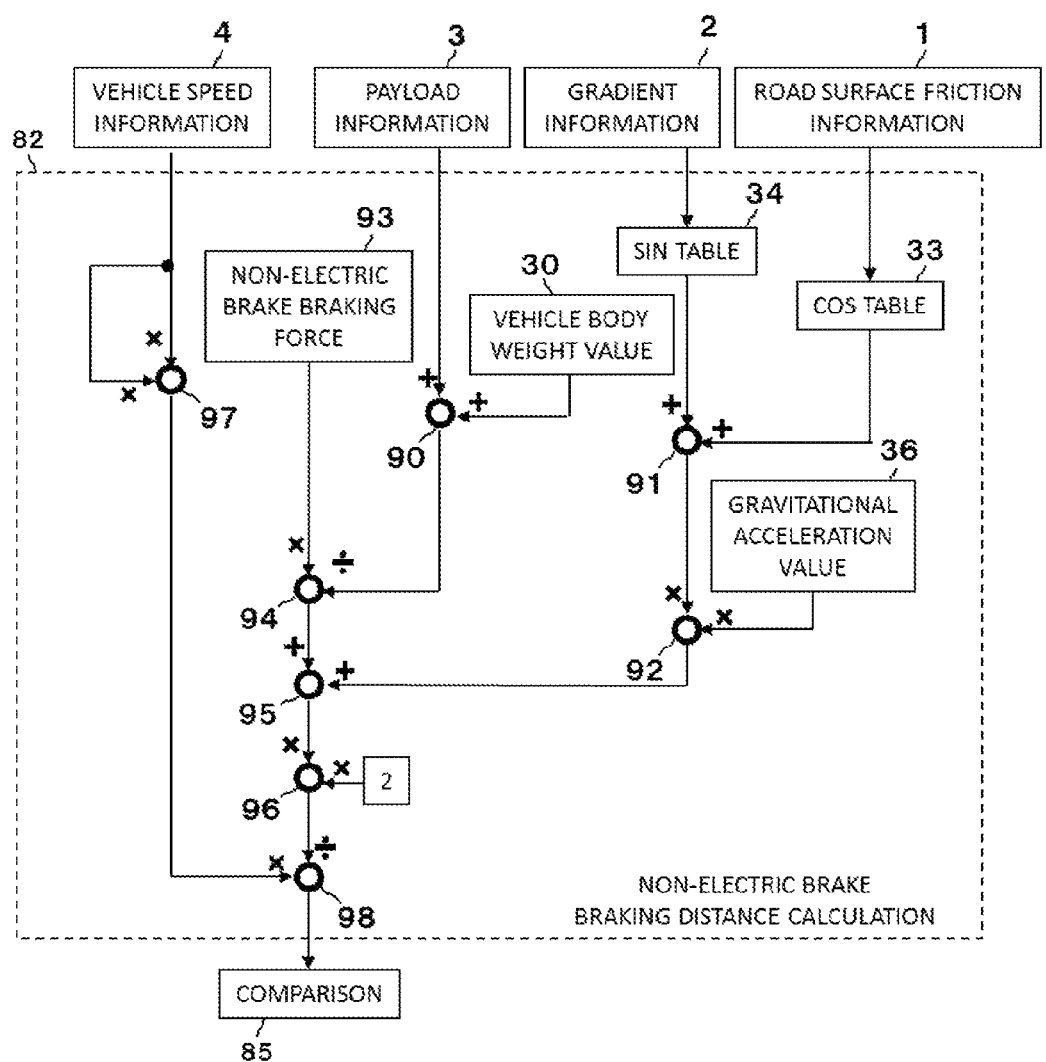
FIG. 8 is a functional block diagram of a non-electric brake braking distance calculation unit of the braking distance control device according to the second embodiment of the present invention.

FIG. 8 is a functional block diagram of the non-electric brake braking distance calculation unit 82. A procedure for calculating the braking distance in conformity with the expression (2) will be explained below with reference to FIG. 8.

As shown in FIG. 8, the non-electric brake braking distance calculation unit 82 includes storage units 30, 33, 34, 36 and 93, addition units 90, 91 and 95, multiplication units 92, 96 and 97, and division units 94 and 98. The storage unit 93 has stored information on the braking force exerted by the non-electric brake device. While the storage units 30, 33, 34 and 36 are used also for the safety vehicle speed calculation unit 9 and the critical vehicle speed for deceleration calculation unit 5, storage units 30, 33, 34 and 36 specifically for the non-electric brake braking distance calculation unit 82 may also be provided separately.

The non-electric brake braking distance calculation unit 82 first calculates the vehicle body gross weight by having the addition unit 90 add together the payload information inputted from the information acquisition unit 3 and the vehicle body weight value read out from the storage unit 30. Further, the non-electric brake braking distance calculation unit 82 has the addition unit 91 add together a value calculated from the road surface friction information inputted from the information acquisition unit 1 by use of the COS table read out from the storage unit 33 and a value calculated from the gradient information inputted from the information acquisition unit 2 by use of the SIN table read out from the storage unit 34. The non-electric brake braking distance calculation unit 82 has the multiplication unit 92 multiply the value calculated by the addition unit 91 by the gravitational acceleration read out from the storage unit 36.

Subsequently, the non-electric brake braking distance calculation unit 82 has the division unit 94 divide the braking force exerted by the non-electric brake device read out from the storage unit 93 by the value calculated by the addition unit 90. The non-electric brake braking distance calculation unit 82 calculates the deceleration by having the addition unit 95 add together the values calculated by the multiplication unit 92 and the addition unit 95.

Subsequently, the non-electric brake braking distance calculation unit 82 calculates the braking distance according to the expression (3) by using the deceleration calculated by the addition unit 95.

$$L = v^2 / 2a_{mec} \qquad (3)$$

where L represents the braking distance and v represents the current vehicle speed of the vehicle body. A concrete method for calculating the braking distance is as follows: The value calculated by the addition unit 95 is doubled by the multiplication unit 96. Then, the vehicle speed information inputted from the information acquisition unit 4 is squared by the multiplication unit 97, and the braking distance is calculated by the division unit 98 by dividing the value calculated by the multiplication unit 97 by the value calculated by the multiplication unit 96. The non-electric brake braking distance calculation unit 82 calculates and outputs the braking distance as above.

3. Non-Electric Brake Control Unit 86

The non-electric brake control unit 86 is a functional unit that automatically controls the non-electric brake device (unshown) by generating and outputting a braking control signal to the non-electric brake device when necessary on the basis of the safety vehicle speed calculated by the safety vehicle speed calculation unit 9 and the non-electric brake braking distance calculated by the non-electric brake braking distance calculation unit 82. A concrete control procedure for the non-electric brake device in this embodiment is as follows:

First, the braking distance provided by use of the non-electric brake is calculated by the non-electric brake braking distance calculation unit 82 and is inputted to a comparison unit 85. The comparison unit 85 compares the value of the braking distance with a threshold value that has been set for the braking distance provided by use of the non-electric brake device and that has been read out from a storage unit 84. To the non-electric brake control unit 86, the value of the braking distance provided by use of the non-electric brake device is inputted as the result of the comparison performed by use of the comparison unit 85. To the non-electric brake braking distance calculation unit 82, not only the output of the comparison unit 85 but also the value of the safety vehicle speed calculated by the safety vehicle speed calculation unit 9 and the notification settings outputted from the logical product calculation unit 15 are inputted. The non-electric brake control unit 86 judges whether the control of the non-electric brake device is necessary or not based on the outputs of the comparison unit 85 and the logical product calculation unit 15. When the control of the non-electric brake device is judged to be necessary, the non-electric brake control unit 86 outputs the control signal to the non-electric brake device, thereby controls the non-electric brake device, and decelerates the work vehicle to the safety vehicle speed calculated by the safety vehicle speed calculation unit 9. The case where the control of the non-electric brake device is necessary is a case satisfying conditions that the braking distance calculated by the non-electric brake braking distance calculation unit 82 is greater than its threshold value and the setting of the notification 2 is ON in the input from the logical product calculation unit 15. In other words, the control of the non-electric brake device by the non-electric brake control unit 86 is not executed when these conditions are not satisfied.

4. Electric Brake Control Unit 87

The electric brake control unit 87 is a functional unit that selects a target vehicle speed from the safety vehicle speed calculated by the safety vehicle speed calculation unit 9 and the control vehicle speed inputted from the information acquisition unit 80 and brings the vehicle speed of the work vehicle close to the target vehicle speed by controlling the electric brake device (by controlling the torque of the electric motors). A concrete control procedure for the electric brake device in this embodiment is as follows:

First, the value of the control vehicle speed set by use of the information acquisition unit 80 is inputted to a comparison unit 83. The comparison unit 83 compares the value of the control vehicle speed with the safety vehicle speed calculated by the safety vehicle speed calculation unit 9. To the electric brake control unit 87, not only the output of the comparison unit 83 but also the vehicle speed controllability information set by use of the information acquisition unit 81 is inputted. The electric brake control unit 87 controls the electric brake device by outputting a control signal (torque control signal to the electric motors) to the electric brake device on the basis of the result of the comparison by the comparison unit 83 and the vehicle speed controllability information, and decelerates the work vehicle to the target vehicle speed when necessary. A case where the control of the electric brake device is necessary is a case where the vehicle speed control function has been set to ON (enabled) in the vehicle speed controllability information inputted from the information acquisition unit 81. In other words, the control of the electric brake device by the electric brake control unit 87 is not executed when the vehicle speed control function has been set to OFF (disabled). Incidentally, the target vehicle speed is the lower vehicle speed selected from the control vehicle speed and the safety vehicle speed.

5. Effect

Also in this embodiment, effects similar to those of the first embodiment can be achieved by the functions of the safety vehicle speed calculation unit 9, the critical vehicle speed for deceleration calculation unit 5, the operator operation judgment unit 14, the logical product calculation unit 15, the vehicle speed command unit 16, the notification command unit 17, the communication command unit 18, etc. Besides, the following effects are achieved in this embodiment:

In this embodiment, the braking distance control device is additionally provided with the non-electric brake control unit 86 and is configured to judge whether or not the braking by use of the non-electric brake device is necessary based on the calculated value of the non-electric brake braking distance and to bring the vehicle speed close to the safety vehicle speed by controlling the non-electric brake device when the braking by use of the non-electric brake device is judged to be necessary. With such features, even when the brake operation by the operator is not performed appropriately, the increase in the braking distance can be reduced by controlling the vehicle speed while using the safety vehicle speed corresponding to the current traveling condition as a target speed.

The braking distance control device is provided with the electric brake control unit 87 and is configured to select the target vehicle speed from the safety vehicle speed and the control vehicle speed and to bring the vehicle speed close to the target vehicle speed by controlling the torque of the electric motors. With such features, when the operator sets the control vehicle speed and the electric brake device is automatically controlled by using the control vehicle speed as the upper limit of the vehicle speed, even in cases where the control vehicle speed is too fast to secure the safety due to a change in the condition, for example, the safety vehicle speed serves as the target vehicle speed in such a case and the electric brake device is automatically controlled accordingly. Thus, the increase in the braking distance can be reduced appropriately depending on the situation.

Other Examples

While the above description has been given by using examples in which the braking distance control device includes the critical vehicle speed for deceleration calculation unit 5, the safety vehicle speed calculated by the safety vehicle speed calculation unit 9 is not a value arbitrarily set by the operator but a value calculated each time by taking into account the vehicle speed, the payload, the road surface information, etc. similarly to the critical vehicle speed for deceleration, and thus the work vehicle can be stopped safely only with the electric brake device as long as the safety vehicle speed is not exceeded. Therefore, the critical vehicle speed for deceleration calculation unit 5 can be left out as long as the vehicle speed command unit 16 commands the operator to keep to the safety vehicle speed and the operator drives the vehicle so as not to exceed the safety vehicle speed, for example.

Further, while the above description has been given by using examples in which the braking distance control device includes both the vehicle speed judgment unit 8 and the vehicle speed command unit 16, the effect of reducing the increase in the braking distance can be expected even if the status judgment on the braking distance by the vehicle speed judgment unit 8 or the notification of the safety vehicle speed by the vehicle speed command unit 16 is made independently. Thus, the effect of reducing the increase in the braking distance can be expected even if the vehicle speed judgment unit 8 or the vehicle speed command unit 16 is left out. When the vehicle speed judgment unit 8 is left out, units that use the result of the judgment by the vehicle speed judgment unit 8, such as the notification command unit 17, can also be left out. Furthermore, while the above description has been given by using examples in which the logical product of the results of the judgments by the vehicle speed judgment unit 8 and the operator operation judgment unit 14 is used when the notification command is issued, if the purpose is just to call the operator's attention to the brake operation based on the safety vehicle speed, it is not absolutely necessary to take the operator's operating status into account and the operator operation judgment unit 14 and the logical product calculation unit 15 can be left out depending on the situation.

While the second embodiment has been described by using an example in which the braking distance control device includes both the non-electric brake control unit 86 and the electric brake control unit 87, the effect of reducing the increase in the braking distance can be expected independently from the function of the non-electric brake control unit 86 or the function of the electric brake control unit 87. Thus, the effect of reducing the increase in the braking distance can be expected even if one of the non-electric brake control unit 86 and the electric brake control unit 87 is left out in the second embodiment. When the non-electric brake control unit 86 is left out, the braking distance calculation unit 82 for calculating the braking distance provided by use of the non-electric brake device can also be left out. In a case where the braking distance control device includes one of the non-electric brake control unit 86 and the electric brake control unit 87, at least one of the vehicle speed judgment unit 8 and the vehicle speed command unit 16 can be left out.

Further, while the second embodiment has been described by using an example in which the braking distance control device includes the critical vehicle speed for deceleration calculation unit 5, the critical vehicle speed for deceleration is not used in the electric brake control unit 87. Thus, the critical vehicle speed for deceleration calculation unit 5 may also be left out in a case where the increase in the braking distance is reduced by the function of the electric brake control unit 87 and part or all of the functions of the vehicle speed judgment unit 8, the operator operation judgment unit 14, the logical product calculation unit 15, the vehicle speed command unit 16, the notification command unit 17, the communication command unit 18 and the non-electric brake control unit 86 are left out.

Furthermore, while the above description has been given by using examples in which the present invention is applied to an electrically driven work vehicle in which an operator rides, the present invention is applicable also to a remote controlled work vehicle, for example. Moreover, automatic control of the electric brake device like the control described in the second embodiment can achieve advantageous effects not only when the technology is applied to a work vehicle operated by an operator but also when the technology is applied to an unmanned vehicle (automatically driven work vehicle).

DESCRIPTION OF REFERENCE CHARACTERS

1 to 4: Information acquisition unit
5: Critical vehicle speed for deceleration calculation unit
8: Vehicle speed judgment unit
9: Safety vehicle speed calculation unit
14: Operator operation judgment unit 15: Logical product calculation unit
16: Vehicle speed command unit
17: Notification command unit
82: Braking distance calculation unit
86: Non-electric brake control unit
87: Electric brake control unit

The invention claimed is:

1. A braking distance control notification system employed for an electrically driven work vehicle that is equipped with an AC generator driven by a prime mover and travel electric motors driven by electric power supplied from the AC generator and is braked by an electric brake device using torque generated by the electric motors, comprising:
an information acquisition unit that acquires gradient information, payload information, road surface friction information, and vehicle speed information;
a safety vehicle speed calculation unit that calculates a safety vehicle speed at which a braking distance provided by use of the electric brake device becomes less than or equal to a threshold value, on the basis of the gradient information, the payload information, the road surface friction information, the vehicle speed information, and a previously given braking torque characteristic of the electric motors;
a critical vehicle speed for deceleration calculation unit that calculates a critical vehicle speed for deceleration at which deceleration provided by use of the electric brake device becomes less than or equal to a threshold value, on the basis of the gradient information, the payload information, the road surface friction information, the vehicle speed information, and the braking torque characteristic;
a vehicle speed judgment unit that judges whether or not the work vehicle can be stopped within a set distance by use of the electric brake device, on the basis of result of comparing the vehicle speed information acquired by the information acquisition unit with the safety vehicle speed and the critical vehicle speed for deceleration, the vehicle speed judgment unit being configured to:
judge that settings of notifications 1 and 2 are both OFF, when the vehicle speed information is less than the safety vehicle speed;
judge that the setting of the notification 1 is ON and the setting of the notification 2 is OFF, when the vehicle speed information is less than the critical vehicle speed for deceleration but is higher than or equal to the safety vehicle speed; and
judge that the setting of the notification 2 is ON and the setting of the notification 1 is OFF, when the vehicle speed information is higher than or equal to the critical vehicle speed for deceleration,
the notification 1 being a notification operation for notifying the operator of the situation where it can become impossible to stop the work vehicle within the set distance with only the electric brake device, and
the notification 2 being a notification operation for prompting active operation on a non-electric brake device in a situation where it is difficult to stop the work vehicle within the set distance with only the electric brake device;
an operator operation judgment unit that judges the settings of the notifications 1 and 2 on the basis of operation amounts of an accelerator pedal, an electric brake pedal that is a pedal of the electric brake device, and a non-electric brake pedal that is a pedal of the non-electric brake device, the operator operation judgment unit being configured to:
judge that the settings of the notifications 1 and 2 are both ON, when the accelerator pedal operation amount is less than a corresponding threshold value of the setting, and judge that the settings of the notifications 1 and 2 are both OFF, when the accelerator pedal operation amount remains greater than or equal to the threshold value and the operation duration time is longer than or equal to a set time;
judge that the settings of the notifications 1 and 2 are both ON, when the electric brake pedal operation amount is less than a corresponding threshold value of the setting, and judge that the setting of the notification 2 is ON and the setting of the notification 1 is OFF, when the electric brake pedal operation amount is greater than or equal to the threshold value; and
judge that the settings of the notifications 1 and 2 are both ON, when the non-electric brake pedal operation amount is less than a corresponding threshold value of the setting, and judge that the settings of the notifications 1 and 2 are both OFF, when the non-electric brake pedal operation amount is greater than or equal to the threshold value;
a logical product calculation unit that calculates logical products of results of the judgments by the vehicle speed judgment unit and the operator operation judgment unit, and that outputs, as a notification setting of the notification operation, only those of the notifications 1 and 2 judged to be ON by both the vehicle speed judgment unit and the operator operation judgment unit; and
a notification command unit that commands a notification device to perform the notification operation for calling an operator's attention or prompting an operator's brake operation, on the basis of the notification setting output from the logical product calculation unit.

2. A braking distance control notification system employed for an electrically driven work vehicle that is equipped with an AC generator driven by a prime mover and travel electric motors driven by electric power supplied from the AC generator and is braked by an electric brake device using torque generated by the electric motors, comprising:
an information acquisition unit that acquires gradient information, payload information, road surface friction information, and vehicle speed information;
a safety vehicle speed calculation unit that calculates a safety vehicle speed at which a braking distance provided by use of the electric brake device becomes less than or equal to a threshold value, on the basis of the gradient information, the payload information, the road surface friction information, the vehicle speed information, and a previously given braking torque characteristic of the electric motors;
a critical vehicle speed for deceleration calculation unit that calculates a critical vehicle speed for deceleration at which deceleration provided by use of the electric brake device becomes less than or equal to a threshold value, on the basis of the gradient information, the payload information, the road surface friction information, the vehicle speed information, and the braking torque characteristic; and
a vehicle speed command unit that commands a notification device to perform a notification operation for notifying an operator of the critical vehicle speed for deceleration and the safety vehicle speed.

3. The braking distance control notification system according to claim 2, comprising:
- a braking distance calculation unit that calculates a braking distance provided by use of a non-electric brake device, on the basis of the gradient information, the payload information, the road surface friction information, the vehicle speed information, and a previously given value of braking force of the non-electric brake device; and
- a non-electric brake control unit that judges whether or not the braking by use of the non-electric brake device is necessary, on the basis of the braking distance calculated by the braking distance calculation unit and brings the vehicle speed close to the safety vehicle speed by controlling the non-electric brake device when the braking by use of the non-electric brake device is judged to be necessary.

4. The braking distance control notification system according to claim 2, comprising an electric brake control unit that selects a target vehicle speed from among the safety vehicle speed and a control vehicle speed and brings the vehicle speed close to the target vehicle speed by controlling the torque of the electric motors.

* * * * *